Oct. 8, 1957 E. R. MILLEN 2,808,755
CONSTANT SENSITIVITY RADIANT ENERGY MEASURING APPARATUS
Filed May 28, 1953 4 Sheets-Sheet 1
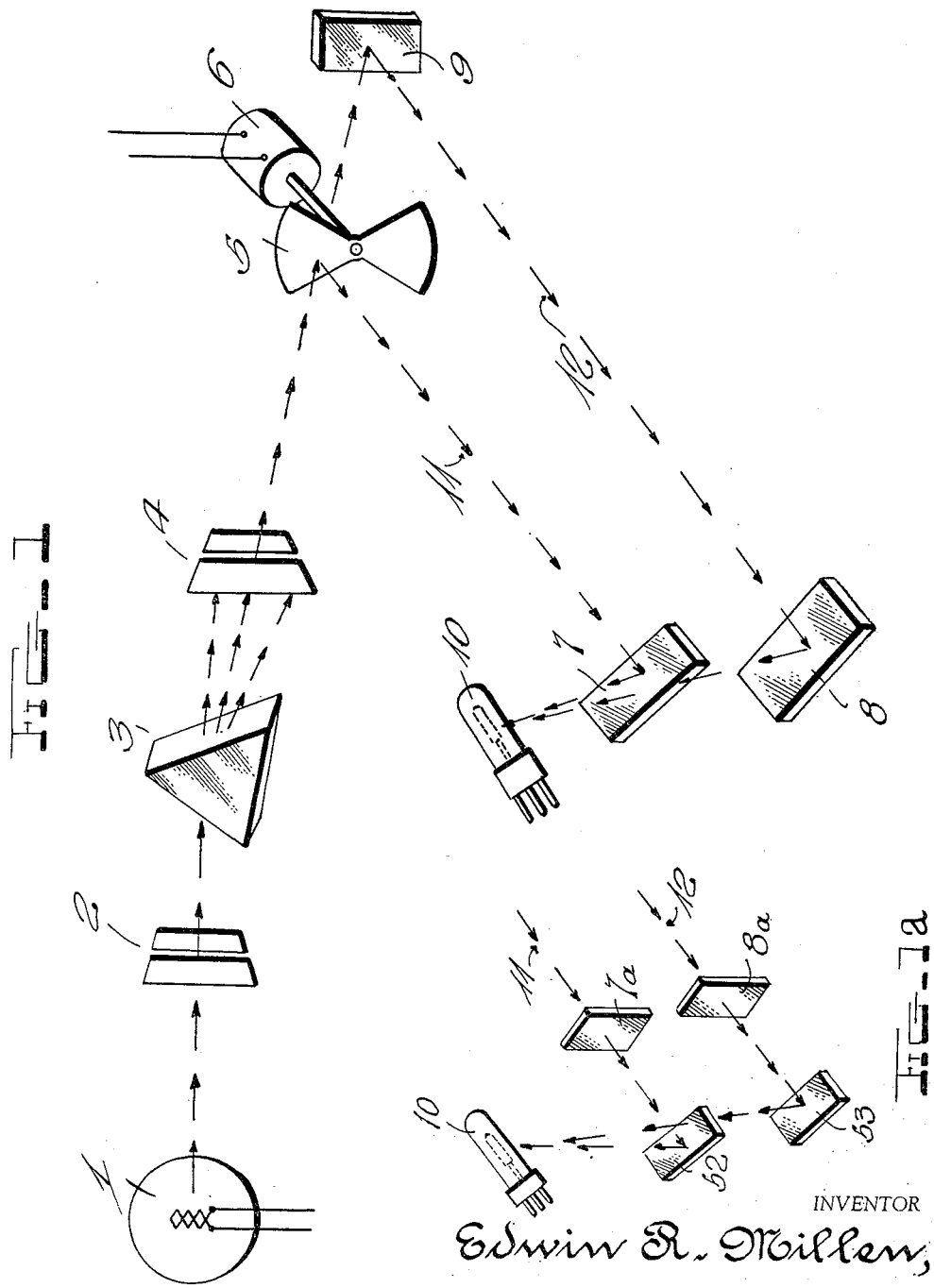
INVENTOR
Edwin R. Millen,
BY Brown, Critchlow, Flick & Peckham,
ATTORNEYS

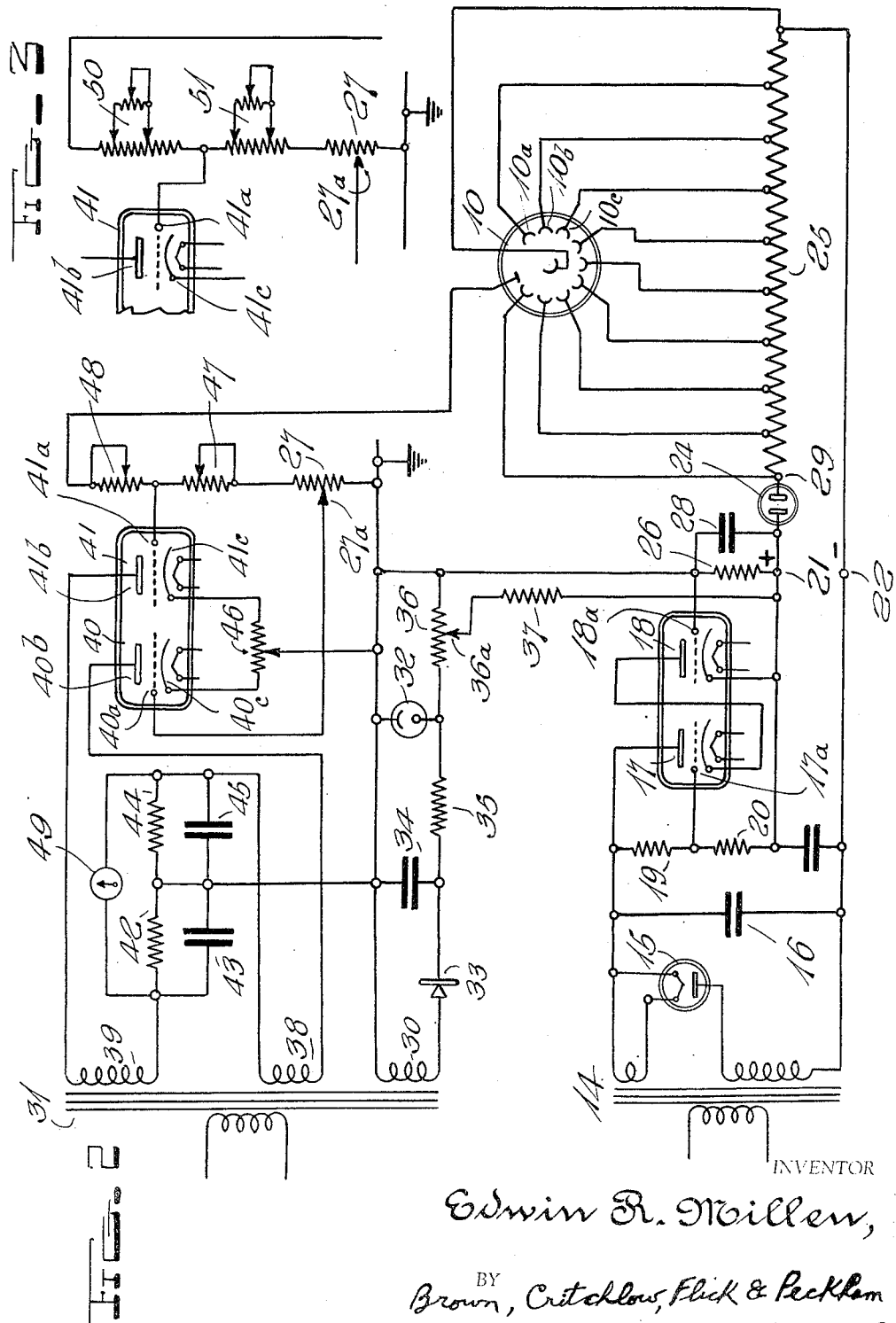

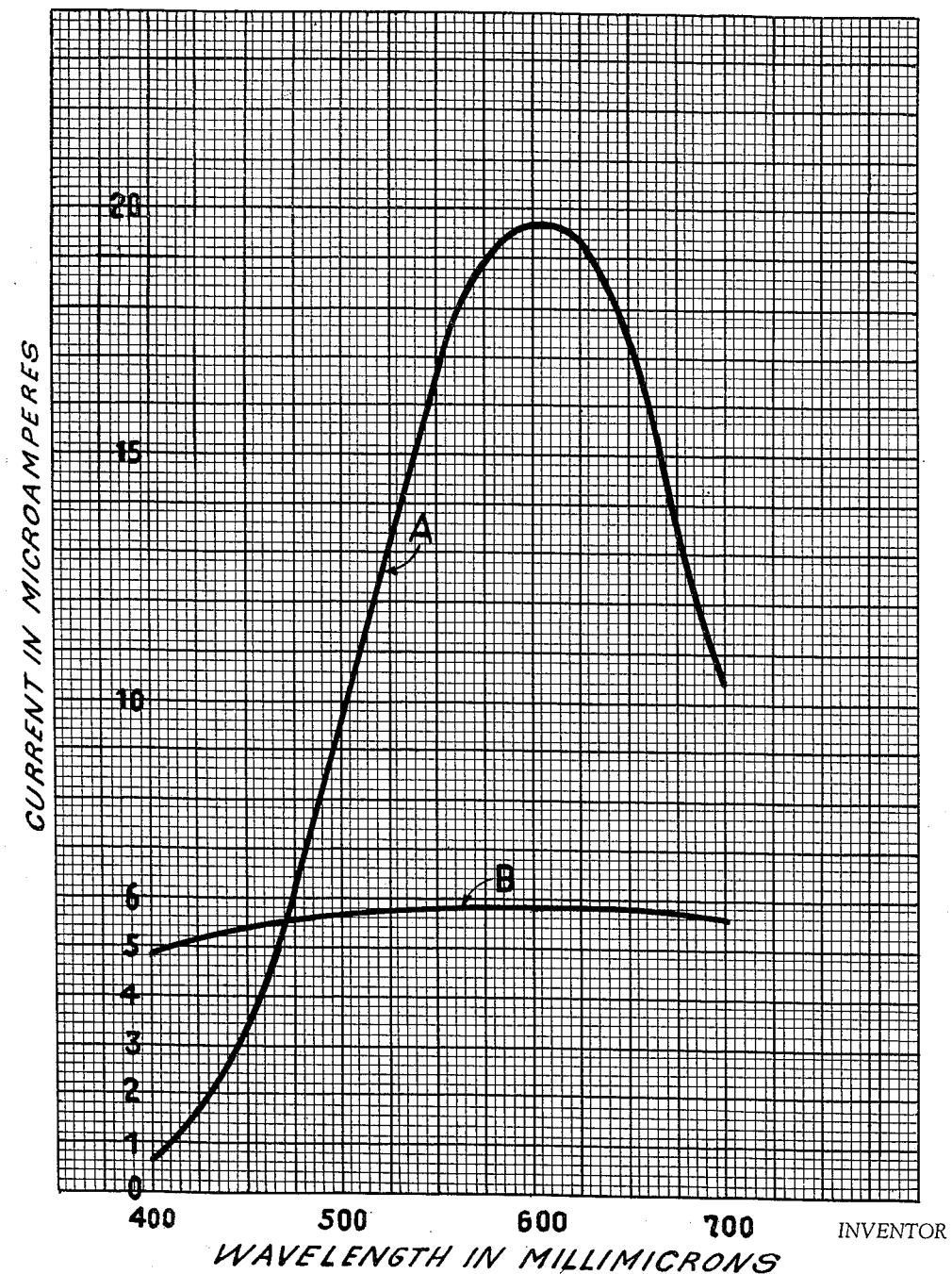

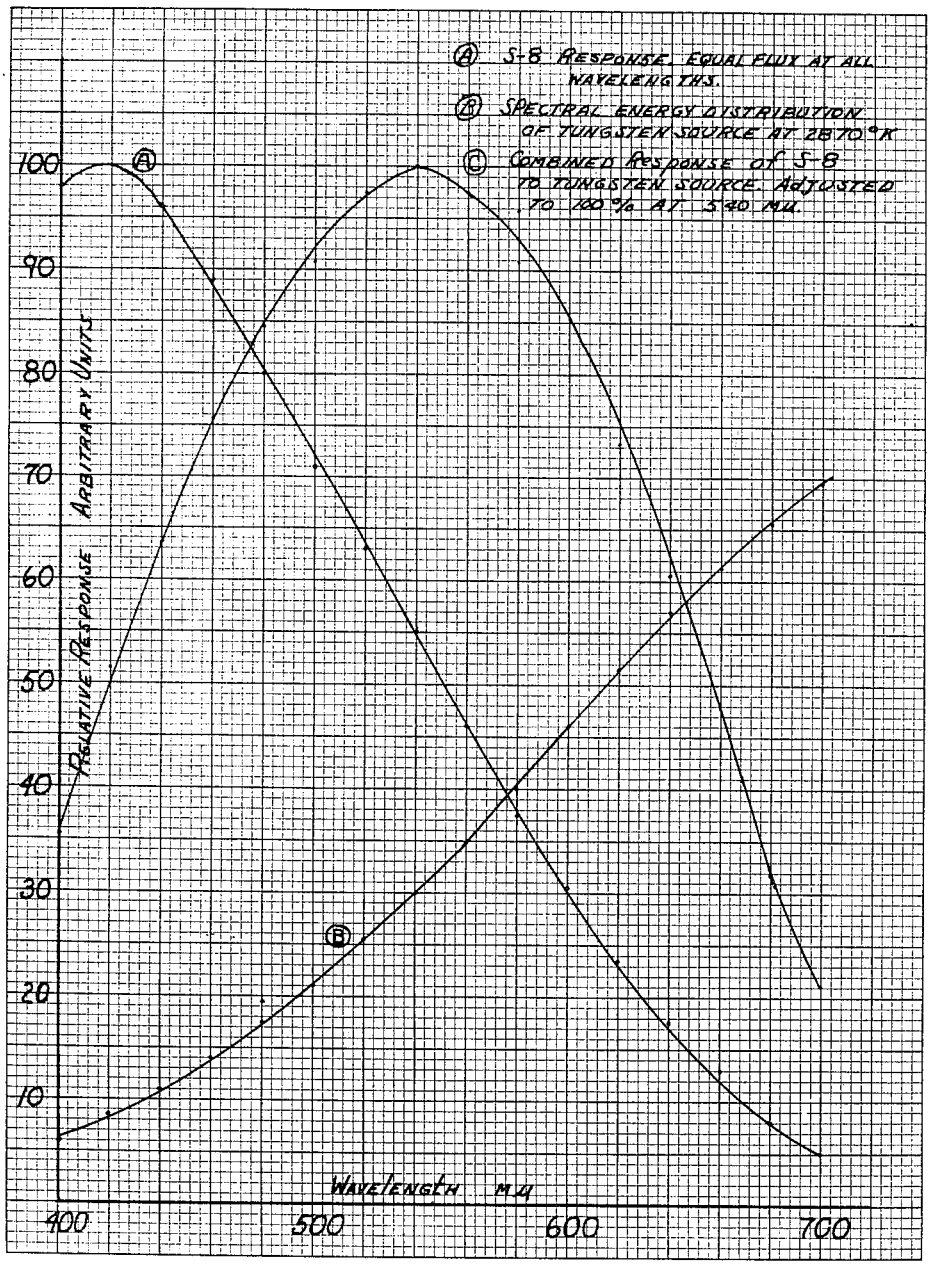

United States Patent Office 2,808,755
Patented Oct. 8, 1957

2,808,755
CONSTANT SENSITIVITY RADIANT ENERGY MEASURING APPARATUS

Edwin R. Millen, Bellevue, Wash., assignor to Fisher Scientific Company, Pittsburgh, Pa., a corporation of Pennsylvania Application May 28, 1953, Serial No. 380,331

8 Claims. (Cl. 88—14)

This invention relates to apparatus for measuring or indicating the relative intensities of beams of radiant energy. More particularly, it relates to reflection or transmission photometers and spectrophotometers.

One of the objects of my invention is to provide means for automatically adjusting the sensitivity of the light measuring means in a spectrophotometer system so that substantially constant sensitivity will be secured at all wave-lengths.

Another object of my invention is to provide a spectrophotometer system having means for protecting the light sensitive detector against exposure to excessively bright light intensities.

Still another object of my invention is to provide a spectrophotometer employing a phototube of the multiplier type.

A further object of my invention is to provide a circuit arrangement for a spectrophotometer system having means for directing two beams of energy upon a multiplier phototube having its voltage supply connected to and controlled by the average phototube output so that the voltage supplied to the multiplier tube is varied to maintain constant output current in the system.

A sill further object of my invention is to provide a circuit arrangement for a spectrophotometer system having means for electrically compensating for inequalities in reference and sample light beams directed upon a multiplier tube.

Other and further objects of my invention reside in the circuit arrangement for a spectrophotometer system as set forth more fully in the specification hereinafter following by reference to the accompanying drawings, in which:

Figure 1 is a diagrammatic and schematic view of the optical system embodying the principles of my invention showing the means for securing the reference and sample beams;

Fig. 1a is a fragmentary view showing the manner of carrying out my invention where the comparison beams pass through the reference standard and sample;

Fig. 2 shows a circuit arrangement embodying the system of my invention;

Fig. 3 illustrates a modified form of the adjusting means for the circuit of Fig. 2;

Fig. 4 shows the improved characteristic of the circuit of my invention (curve B) as compared to the operation of previously known spectrophotometer systems (curve A); and Fig. 5 is a curve diagram showing the combined response of a photomultiplier tube responding to the spectral energy distribution of a tungsten lamp source.

In spectrophotometry it is common practice to compare the intensity of a beam of light reflected from or transmitted through a sample of the material being tested with the intensity of a second beam of light reflected from or transmitted through a standard sample. The reference or standard sample is generally a material selected to represent 100% transmission or reflectance since this simplifies the measuring means employed to determine the ratio of the beams, i. e., the percent transmission or reflectance through or from the sample.

Since stabilization of the light source to maintain constancy of the beam intensities is difficult and inconvenient, one common arrangement of the apparatus consists of measuring means employed as a null detector to indicate when both beams are equal and an optical or mechanical attenuator placed in the reference beam to reduce the reference beam to the same intensity as the sample beams. This eliminates the need for maintaining constancy of the source light intensity. However, variations in spectral response of the photocell or light detecting means, together with the large variation of spectral energy output of the light sources over the wavelength region that measurements are to be made, cause large variations in sensitivity, resulting in an instrument excessively sensitive for convenience at some wavelengths and too insensitive for accurate measurements at others.

The use of an attenuator in the optical path introduces difficulties since the light beams are rarely homogeneous and the light attenuation is seldom a linear function of the area of light beam intercepted. The automatic control of sensitivity eliminates the need of optical attenuation means for balancing the light beams, since the input or signal range over which the detecting means must be linear is substantially controlled and constant.

The amplification or current gain of multiplier phototubes varies widely even among tubes of the same type. This variation exceeds factors of 10. The constant sensitivity system minimizes the selection of tubes or adjustments necessary for their use.

Moreover, the system of my invention provides protection for the light sensitive detector. Multiplier phototubes when employed as light detectors of great sensitivity are easily damaged or destroyed by exposures to large light intensities. Since increasing the light intensity in the constant sensitivity system does not increase the phototube output, the multiplier tube is protected from such damage.

In addition, the substantially constant output current or signal level greatly simplifies the measuring means required to measure or indicate the relative intensity or ratio of the sample and reference beams.

Referring to the drawings in more detail, Fig. 1 schematically shows the rays from a source of light 1 passing through an entrance slit 2 and being dispersed by prism 3 and thence through exit slit 4. The monochromatic light thus obtained is split into two beams by the rotating chopper or shutter 5 driven synchronously by motor 6. The use of an 1800-R. P. M. motor and two-bladed shutter 5 results in the beam impinging alternately on the reference standard 7 through chopper 5 and sample 8 by reflection from mirror 9 with each being illuminated 60 times a second. A photomultiplier tube 10 intercepts and measures the light reflected from the reference standard 7 and sample 8. Light reaches reference standard 7 along path 11 and light reaches sample 8 along path 12.

Fig. 1a shows the manner in which comparative measurements are made by passing beams 11 and 12 through the reference standard 7a and through the sample at 8a for reflection by surfaces 52 and 53, respectively, onto the multiplier phototube 10.

Referring to Fig. 2, power transformer 14 supplies power to rectifier 15 and the D. C. output voltage is filtered by capacitor 16 and connected to the triode tubes 17 and 18 connected in series, and also to resistors 19 and 20 connected in series. Tubes 17 and 18 and resistors 19 and 20 are connected in shunt, forming a bridge. The output voltage of the supply appears at terminals 21 and 22 with positive polarity at terminal 21. The output voltage is connected to the photomultiplier tube 10 through voltage regulator 24 and a voltage divider 25, to provide a sequence of voltages to the dynodes of the photomultiplier tube 10, previously shown in Fig. 1, as required for operation. Photomultiplier tube 10 contains a multiplicity of dynodes 10a, 10b, 10c, etc., which are excited in equal potential steps.

Light falling on the multiplier 10 from the sample 8 and reference standard 7 causes current to flow through resistor 26 and potentiometer 27 in proportion to the light energy. Resistor 26 is shunted by capacitor 28, thus producing a time constant sufficiently long that the voltage appearing across resistor 26 is the average of the sum of the currents caused by the reference standard and sample beams 11 and 12. The voltage across potentiometer 27 varies with the instantaneous light intensity of either beam.

The voltage developed across resistor 26 is applied to the grid 18a of triode 18 and biases this tube negatively in proportion to the average of the light impinging upon the multiplier 10. Increasing the grid bias of tube 18 raises its plate potential, which in turn negatively biases the grid 17a of triode tube 17 whose grid 17a is connected to the junction of equal resistors 19 and 20. This increases the voltage drop across the tubes 17 and 18, and reduces the voltage applied to the multiplier 10 at terminals 21 and 22, thus reducing the sensitivity of the multiplier. The photomultiplier tube sensitivity changes in the operation range, in proportion to the dynode potential changes.

The bridge connection of resistors 19 and 20 and tubes 17, 18 causes the voltage drop across the two tubes to be equal, thus permitting the use of ordinary tubes such as 12AX7's to handle a total voltage drop of 500 to 600 volts.

The voltage regulator 24 maintains constant voltage across points 21 and 29, the voltage supply to the multiplier collector, to insure adequate collector voltage for linearity of output current of the multiplier up to the maximum current value to be measured.

Winding 30 of transformer 31 supplies voltage to voltage regulator 32 through rectifier 33, filter capacitor 34, and resistor 35. This voltage appears across potentiometer 36, and a portion is applied across resistor 26 through resistor 37 and variable tap 36a on potentiometer 36. This biases the grid 18a of tube 18 positively and serves as a threshold control so that voltage reduction across points 21 and 22 is not accomplished unless multiplier current flow is sufficient to cause a larger voltage drop across resistor 26 than that set by potentiometer 36.

The remainder of the circuit shown comprises one of several means by which the ratio of the sample and reference standard beams 12 and 11 may be obtained. Windings 38 and 39 of the transformer 31 are oppositely phased and supply triode tubes 40 and 41, respectively. The output of tube 41 appears across the combination in shunt of resistor 42 and capacitor 43. The output of tube 40 appears across the combination in shunt of resistor 44 and capacitor 45. With no voltage across potentiometer 27, potentiometer 46 connected between the cathodes 40c and 41c is used for balancing the two tubes 40 and 41. Anodes 40b and 41b are supplied with power from transformer windings 38 and 39 respectively. Control grids 40a and 41a are controlled as to bias from the adjustable tap 27a on potentiometer 27 and from a tap between resistance 47 and 48 disposed in series between potentiometer 27 and multiplier tube 10.

The shutter 5 shown in Fig. 1 is phased so that light from the reference standard 7 falls on the phototube 10 only while the voltage supply from winding 38 to the anode 40b of tube 40 is positive and light from the sample 8 falls on the phototube 10 only while the voltage supply to tube 41 from winding 39 is positive. The percent reflectance of the sample 8 is then determined by moving the contact 27a of potentiometer 27 until balance is indicated by the meter 49. The percent reflectance is proportionate to the ratio of the resistance of the contact arm from adjustable contact 27a to ground to the total resistance of the potentiometer 27 corresponding to 100% reflectance. The 100% reflectance point calibration is established by using a second reference standard in place of the sample.

Inequality of the reference and sample beams may be compensated electrically by inserting a dual potentiometer 50, 51 as shown in Fig. 3. These are connected so that the sum of resistances of 50 and 51 is a constant. This method requires that the reference beam 11 is designed to equal or exceed the intensity of the sample beam 12.

Fig. 5 is a curve diagram showing the combined response of a photomultiplier tube responding to the spectral energy distribution of a tungsten lamp source provided at 1 in Fig. 1. The photomultiplier tube itself has a unique spectral response, but when excited from the energy emitted from a tungsten lamp source, the output of the photomultiplier tube is a combination of its own spectral response curve and the spectral emission curve of the tungsten lamp. In Fig. 5 the ordinates of the graph are arbitrary units designating relative response while the abscissa are the same as in Fig. 4 wave-length in millimicrons. Curve A indicates the S-8 response for equal flux at all wave-lengths. All photosensitive surfaces of the photomultiplier tubes fall into general classifications according to spectral response; the spectral response being determined by the chemical coating applied in the manufacturing process. "S-8" is a general designation of a particular type of photo-emitting surface. This general designation is used by all manufacturers of phototubes and photomultipliers and is generally acceptable in the electronic industries as a specification or a classification in general acceptance and use.

Curve B shows the spectral energy distribution of a tungsten light source at 2870° K. Curve C shows the combined response of S-8 to a tungsten light source 1 adjustable to 100% at 540 millimicrons.

The principles of my invention employed may be used in arrangements which have uses other than in the art of photometry. Accordingly, I desire that it be understood that no limitations upon my invention are intended other than may be imposed by the scope of the appended claims.

What I claim as new and desire to secure by Letters Patent of the United States, is as follows:

1. A radiant energy indicating system employing a multiplier phototube including a plurality of spatially related dynodes, means for directing beams of light upon said phototube alternately from a reference standard and from a sample, a pair of separate power supply circuits connected with separate power output circuits, a resistor and voltage divider connected with one of said power output circuits, a potentiometer connected across the other of said power output circuits, a third power supply circuit, a rectifier connected with said third power supply circuit, a potentiometer connected with the output of said third power supply circuit, a series circuit interconnecting said resistor, said voltage divider, and said potentiometer, measuring means for determining the ratio of the intensity of the beams of light and taps interconnecting points on said voltage divider and one of said potentiometers with the spatially related dynodes of said multiplier phototube.

2. A radiant energy indicating system as set forth in claim 1 in which one voltage regulator is interposed between said rectifier and the potentiometer in the output circuit of said third power supply circuit and in which another voltage regulator is interposed between said resistor and said voltage divider.

3. A radiant energy indicating system as set forth in claim 1 in which each of said power supply circuits includes a balanced electron tube bridge circuit one of which connects with said resistor and voltage divider and the other of which connects with said second mentioned potentiometer.

4. A radiant energy indicating system as set forth in claim 1 in which a path for current is connected between a point intermediate said resistor and voltage divider and an adjustable tap on the potentiometer in the output of said third power supply circuit, said path for current including a current regulating resistance.

5. A radiant energy indicating system as set forth in claim 1 in which a dual potentiometer is connected between one of said dynodes and the potentiometer in said second mentioned power output circuit for selectively adjusting the potential supplied to said dynodes.

6. A radiant energy indicating system as set forth in claim 1 in which an adjustable potentiometer is interposed between one of said dynodes and the potentiometer that connects across the second mentioned power output circuit.

7. A radiant energy indicating system as set forth in claim 1 in which one of said power supply circuits includes a pair of oppositely phased power transformers connected with individual electron tube circuits having their outputs terminating in said second mentioned potentiometer, and means connected with said electron tube circuits for balancing the operation of said last mentioned power supply circuit with respect to said second mentioned potentiometer.

8. A radiant energy indicating system as set forth in claim 1 in which one of said power supply circuits comprises a pair of oppositely phased power transformers, including secondary windings, and in which said measuring means comprises a balancing and indicating circuit connected between the adjacent terminals of said secondary windings, a pair of electron tubes each including at least a cathode, a control grid and an anode, connections between the remote opposite terminals of said secondary windings and the opposite anodes of said electron tubes, circuit connections between the opposite control grids of said electron tubes and said second mentioned potentiometers, a closed circuit path connected between said cathodes, a potentiometer included in said closed circuit path and an adjustable tap on said last mentioned potentiometer and connected with one terminal of the second mentioned power output circuit.

References Cited in the file of this patent
UNITED STATES PATENTS

| | | |
|---|---|---|
| 2,474,098 | Dimmick | June 21, 1949 |
| 2,583,143 | Glick | Jan. 22, 1952 |
| 2,650,307 | Koppins | Aug. 25, 1953 |